United States Patent [19]

Jung

[11] Patent Number: 5,534,760

[45] Date of Patent: Jul. 9, 1996

[54] COMPRESSOR CONTROL CIRCUIT

[75] Inventor: Yeong C. Jung, Seoul, Rep. of Korea

[73] Assignee: Samsung Electronics Co., Ltd., Suwon, Rep. of Korea

[21] Appl. No.: 325,363

[22] PCT Filed: Apr. 29, 1993

[86] PCT No.: PCT/KR93/00034

§ 371 Date: Dec. 28, 1994

§ 102(e) Date: Dec. 28, 1994

[87] PCT Pub. No.: WO93/22716

PCT Pub. Date: Nov. 11, 1993

[30] Foreign Application Priority Data

Apr. 30, 1992 [KR] Rep. of Korea .................... 1992-7359

[51] Int. Cl.$^6$ ............................ H02P 7/01; H02P 6/00; G05D 23/24

[52] U.S. Cl. ......................... 318/442; 318/471; 318/254

[58] Field of Search ..................................... 318/138, 254, 318/439, 440, 442, 459, 471; 62/236

[56] References Cited

U.S. PATENT DOCUMENTS 4,015,182  3/1977  Erdman .............................. 318/254 X
4,772,828  9/1988  Heymans et al. ........................ 318/128
5,056,330  10/1991  Isobe et al. ............................... 62/236

Primary Examiner—Bentsu Ro
Attorney, Agent, or Firm—Burns, Doane, Swecker & Mathis

[57] ABSTRACT

A compressor control circuit adapted to a refrigerator comprises a compressor including a brushless DC motor, a power circuit for separating an AC power source from a DC power source to drive the brushless DC motor, a voltage adjustment switching circuit for selecting the voltage of a power source circuit responsive to the load condition, and a motor control circuit including a two phase control circuit for varying the operation speed of the brushless DC motor in response to the temperature of a freezing chamber, an operation control circuit for enabling the on-off operation of the brushless DC motor to be continued according to the on-off operation of a load sensor in the freezing chamber, and an over-load protecting circuit for stopping the brushless DC motor and cutting off the power source under the overload or binding condition for the compressor. The compressor control circuit adjusts the temperature of an evaporator by the continuous variable speed operation of the brushless DC motor, so that the continuous temperature control characteristics of the evaporator are superior, and the freezing and refrigerating chambers of a refrigerator are kept at a constant, accurate temperature without a temperature ripple.

10 Claims, 4 Drawing Sheets

COMPRESSOR CONTROL CIRCUIT

BACKGROUND

The present invention is related to providing a compressor control circuit, more particularly, providing a circuit for controlling a compressor having a brushless D.C. motor.

In general, it is known that a brushless D.C. motor has advantages; the superior control characteristics are the same as a D.C. motor, and the reduction of noise and power consumption are significant. Therefore, nowadays there is a tendency to adapt the brushless motor to home appliances, but the adaption has lagged behind in respect to the cost and the control techniques below, the satisfaction of users until now. Almost all home appliances are accustomed to being adapted for an A.C. motor. For example, an A.C. induction motor adapted to a compressor of a refrigerator always constitutes a two pole motor which is fixed at the synchronizing speed of around 3500 rpm under the application of an alternative current power having the frequency of 50 to 60 Hz. Therefore, the temperature adjustment in the chambers of the refrigerator is performed at an on-off interval period such that the operation of the compressor is repeatedly turned on and off with a sensor detecting the temperature in a freezing chamber.

But, the operation causes a refrigerator to have the temperature ripple (1°–40° C.). It shortens the storing time for keeping the freshness of refrigerated foodstuffs such as vegetables and fruits, etc. At the start of the operation shifted from the non-operation condition accompanying the on-off operation of the inductive motor, the rush current is relatively greater, thereby requiring a larger amount of consumption power. At this time, the winding current density is five times to ten times over that flowing at the normal operation period. It results in increasing the induction vibration and the electromagnetic noise between a rotator and a stator. Furthermore, the operation noises are more amplified at the band which is resonant with the mechanical inherent vibration frequency of the compressor. The induction motor has a greater induction loss. It causes higher winding heating than that of a D.C. motor to thereby raise the inner temperature of the compressor, thereby deteriorating the operation efficiency thereof and easily degenerating the substance of the compressor.

The compressor has disadvantages due to the property of the A.C. induction motor in that it is difficult to operate at a continuosly variable speed, the operation efficiency is relatively lower, the electromagnetic noise is greater, and the optimum operation range according to the load fluctuation is relatively narrower. Similarly, a compressor adapted to an air conditioner has the same problems.

The refrigerator adopted the same compressor has a relatively greater amount of load fluctuation over 100% at maximum related with the setting of an outside temperature and chamber temperature. It requires the optimum efficiency operation according to the load fluctuation ratio.

An object of the present invention is to provide a compressor control circuit including a brushless D.C. motor, for enabling the operation speed control of a compressor to lead to an ideal continuous operation according to the load fluctuation without intermittent on-off operation.

Another object of the present invention is to provide a compressor control circuit including a brushless D.C. motor of a high efficiency and low noise, further comprising a control apparatus for varying the operation speed of the brushless motor and an operation control circuit for optimizing the operation input of the brushless motor dependent upon load fluctuation to greatly reduce the consumption power.

SUMMARY

In order to accomplish the objects and features, a compressor control circuit adapted to a refrigerator according to the present invention comprises a compressor including a brushless D.C. motor; a compressor operation circuit including a power circuit for separating an A.C. power source from a D.C. power source to drive the brushless D.C. motor and a voltage adjustment switching circuit for selecting the voltage of a power source circuit responsive to the load condition; and a motor control circuit including a two phase control circuit for varying the operation speed of the brushless D.C. motor in response to the temperature of a freezing chamber, an operation control circuit for enabling the on-off operation of the brushless D.C. motor to be continued according to the on-off operation of a load sensor in the freezing chamber, an over-load protecting circuit for stopping the brushless D.C. motor and cutting off the power source under the overload or binding condition of the compressor.

BRIEF DESCRIPTION OF THE DRAWINGS

The present invention will be explained below in detail with reference to the accompanying drawings, in which.

DETAILED DESCRIPTION

Figure 1:
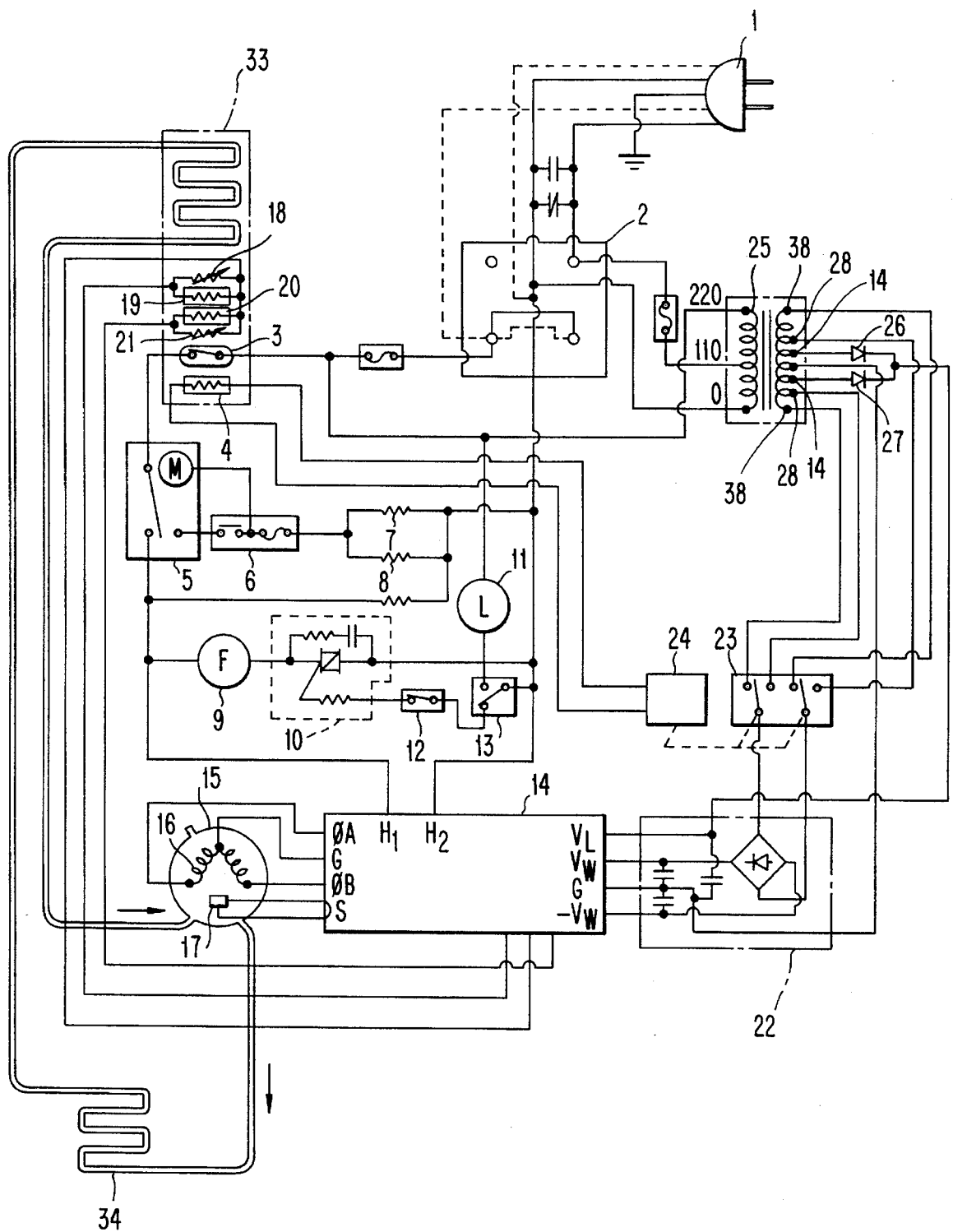
FIG. 1 is a circuit configuration illustrating one embodiment of a compressor control circuit adapted to a refrigerator according to the invention.

FIG. 1 shows a circuit for controlling a compressor including a brushless D.C. motor adapted to a refrigerator according to one embodiment of the present invention. The refrigerator is exemplified as a standard two door type including a freezing chamber and a refrigerating chamber. The refrigerator requires an A.C. power source for operating a defrosting heater, a fan motor and a chamber lamp as well as a compressor including a motor for compressing refrigerant, but a refrigerator adapted to the present invention includes a control circuit for a compressor including a brushless D.C. motor to which a D.C. power source should be applied.

An A.C. power source plug 1 is connected to a selection switch 2 for selecting any one of commercial voltages 110 V and 220 V the power application path of each of which is represented as a dotted line and a solid line in the figure. The power selection switch 2 supplies the power voltage to the first winding of a power transformer 25.

The power transformer 25 has a first winding provided with input taps for the power source of 110 V and 220 V and second winding including full-wave windings of three tap types, for example, 14 V, 28 V and 38 V. The first winding of the transformer is connected in parallel to defrosting heaters 7 and 8, a defrosting timer 5, a fan motor 9 and a chamber lamp 11. At the second winding, the power source of 14 V is rectified in a full-wave form through diodes 26 and 27 to be used as the power source $V_L$ of a motor control circuit. The power sources of 28 V and 38 V are applied through a voltage adjustment selecting switch 24, 23 called a double break, double make type to a full wave rectifying circuit 22. The rectified power sources $V_W$ are is used for driving the brushless D.C motor 15 of the compressor. Herein, it is noted that these portions constituting a D. C. power source use a linear transformer to separate the power source of the first winding from that of the second winding, and the voltage adjustment and rectification is reliable and inexpensive free of electrical noise with the exclusion of the use of a high frequency switching device (SMPS) for PWM: Pulse Width Modulation.

A compressor is connected through a refrigerant flow pipe to an evaporator of a freezing chamber 33 and a condenser 34.

A motor control circuit 14 for driving the brushless D.C. motor 15 for the compressor comprises a two phase control circuit 29 which is registered as U.S. Pat. Nos. 4,472,564 and 4,584,505, issued to the inventor, Mr. Yeong C. Chung the same as that of this application, can be used.

Figure 2:
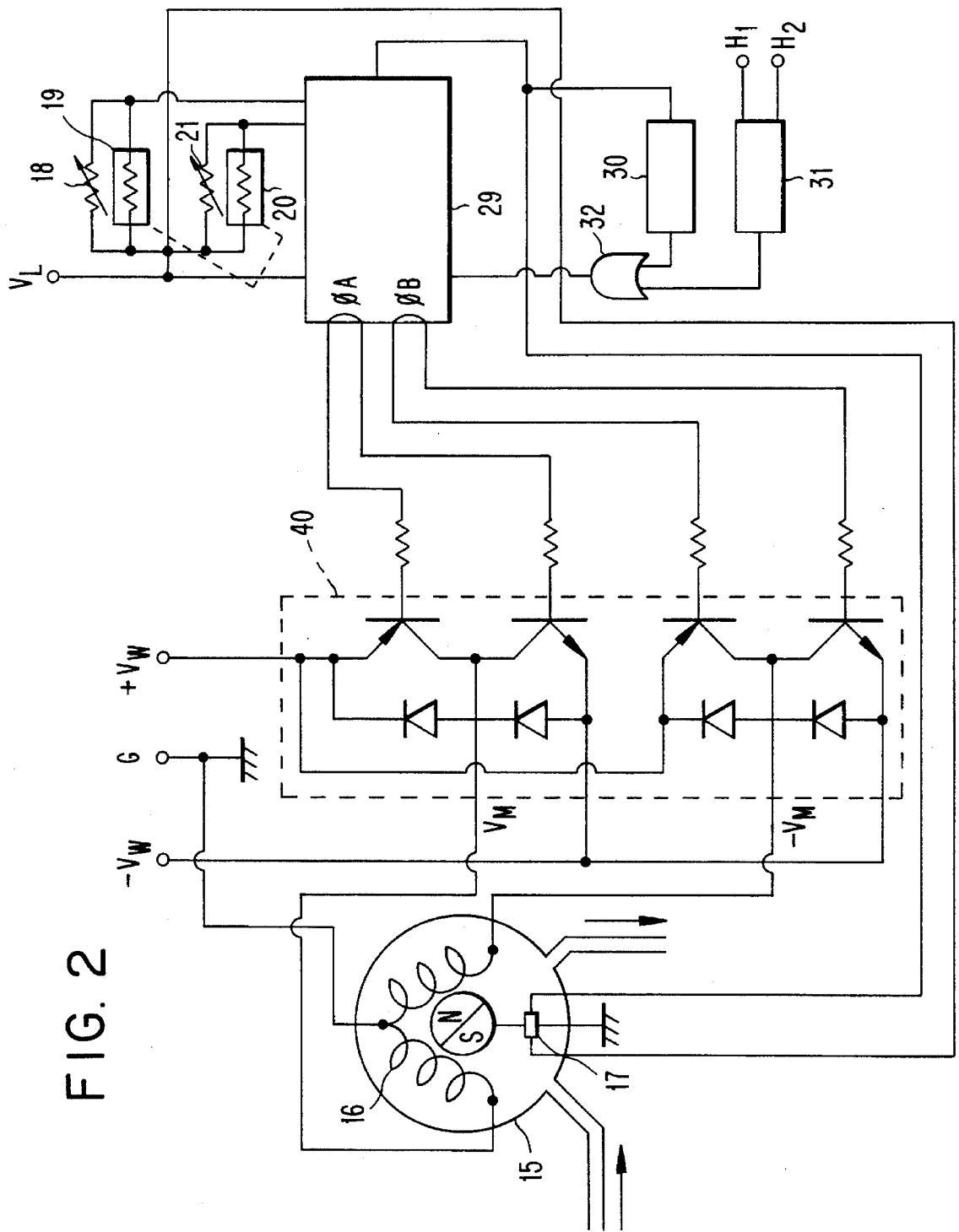
FIG. 2 is a motor control circuit of a brushless D.C. motor illustrating a part of FIG. 1.
Figure 3:
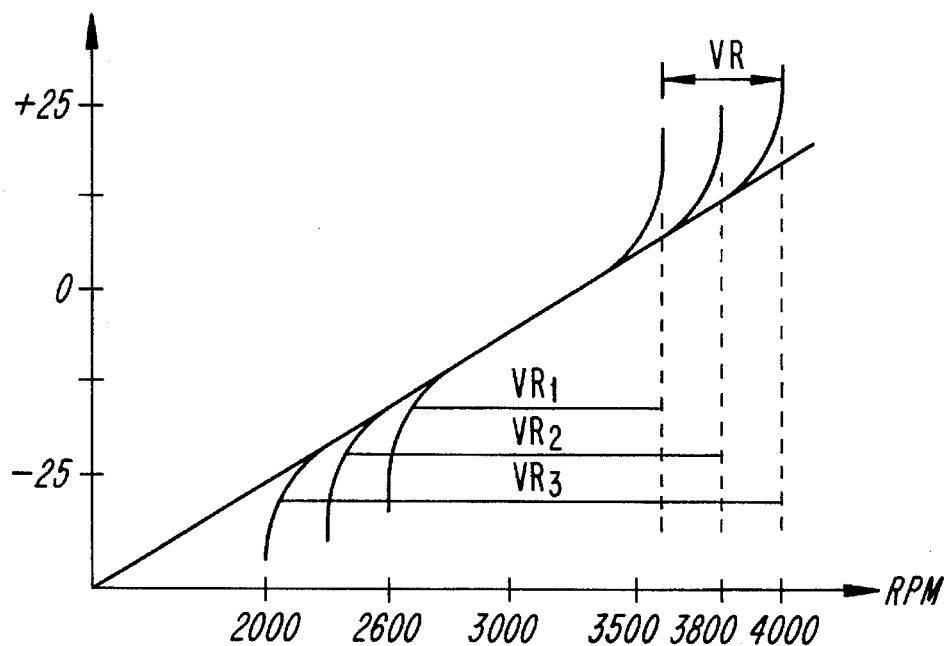
FIG. 3 is a graph illustrating the speed control range of the brushless D.C. motor according to the temperature of an evaporator in a freezing chamber.

Referring to FIG. 2, the motor control circuit 14 is preferably provided with a two phase control circuit 29, an over-load protection circuit 30 for detecting the speed of a rotor, an operation control circuit 31 synchronized through ports $H_1$ and $H_2$ with the on-off operation of a thermostat or thermal switch 3 (FIG. 1), thermistor or temperature sensors 19 and 20 for enabling the speed control of the brushless motor according to the detection of the temperature in a freezing chamber 33, temperature adjustment variable resistors 18 and 21 and an alternating switching amplification circuit 40 including a plurality of power transistors for driving the brushless motor 15.

The two phase control circuit 29 generates two phase signals for driving the brushless motor 15 by means of a position sensor 17, the detailed description of which is omitted, because the technical content is known in the disclosure of U.S. Pat. No. 4,584,505. Also, the two phase control circuit 29 adapted to a refrigerator includes variable resistors 18 and 21 for controlling the operation speed of the brushless motor and temperature sensors 19 and 20 mounted in the freezing chamber 33 or on an evaporator with being connected in parallel to each of the variable resistors 18 and 21. Thus, compressor is driven at an operation speed increased or decreased in proportion to the difference between the detecting temperature and the room temperature at the start of the operation or during the normal operation. The variable resistors 18 and 21 can adjust the increase ratio and the decrease ratio of the operation speed. Also these resistors can be used to set the maximum and minimum speeds.

The alternating switching amplification circuit 40 outputs two phase D.C. power voltages $V_M$ and $-V_M$ in the form of the two phase control signal to the brushless D.C. motor 15 mounted in the compressor.

The brushless D.C. motor 15 includes two coil windings 16 and the position sensor 17 for detecting the position of a rotor. These winding and sensor lines are connected through five pins mounted on the compressor to three output ports of the two phase control circuit 29 and two input ports of the alternating switching amplification circuit 40. Herein it is noted that four transistors are used for two phase bipolar switching, but a general single phase power source requires an eight bridged transistor operating circuit. The closed compressor adapted to the present invention needs only five external electrical connection pins including three pins for supplying the driving currents to the brushless D.C. motor 15 and two pins for sensor signals, but a general compressor requires at least eight pins in the case of a two phase and more than seven pins in the case of a three phase. Especially, the number of the external electrical connection terminals is very important to the closed compressor which is under very critical technical limitation for keeping the vacuum seal with respect to the internal pressure thereof.

An over-load protection circuit 30 is preferably used as a known frequency circuit. The position sensor 17 detects the N and S poles of a rotor to determine the switching frequency of the N pole and the S pole. Thus, assuming, for example, that the reference frequency necessary for the operation of the brushless D.C. motor 15 is already set, and the switching frequency of the N pole and the S pole drops below the reference frequency, the over-load protection circuit 30 outputs the high level signal "H" to enable an OR gate 32 to suppress the output of the two phase control circuit 29. The suppressed state of the two phase control circuit 29 causes the alternating switching amplification circuit 40 to be turned off, thereby cutting off the driving current of the brushless D.C. motor 15 and protecting it. The operation control circuit 31 is turned off during the operation of the thermal switch 3, the defrosting heaters 7 and 8 and the timer 5.

On the other hand, again referring to FIG. 1, a power switch 10 comprises a non-contact switch such as triac which prevents the induction surge voltage from being applied to the fan motor 9. The induction surge voltage is generated at door switches 12 and 13, when the doors of the freezing chamber 33 and the refrigerating chamber 33 are opened/closed. The door switches 12 and 13 are connected in series to the gate of the non-contact switch 10.

Therefore, a refrigerator adapted by the present invention is continuously controlled within the range of 2000 to 4000 rpm according to the temperature of a freezing chamber 33 or an evaporator. Temperature sensors 19 and 20 control each phase of a two phase control circuit 29, so that the average energizing current flowing through a brushless D.C. motor 15 is adjusted to control the operation speed. Variable resistors 18 and 21 connected in parallel to each of the temperature sensors 19 and 20 enable users to manually adjust the range of the automatic operation speed, which is dependent upon the characteristics of the compressor and a refrigeration cycle. For example, when the evaporator is started at the temperature of 25° C. near the room temperature, the compressor is operated at the maximum speed in the predetermined range. As the temperature of the evaporator drops, the operation speed of the compressor is reduced in proportion thereto. At this time, the refrigeration cycle load is reduced until the temperature of the evaporator reaches the lowest temperature. The compressor is operated at the speed to keep the appropriate temperature of the chambers.

Figure 4:
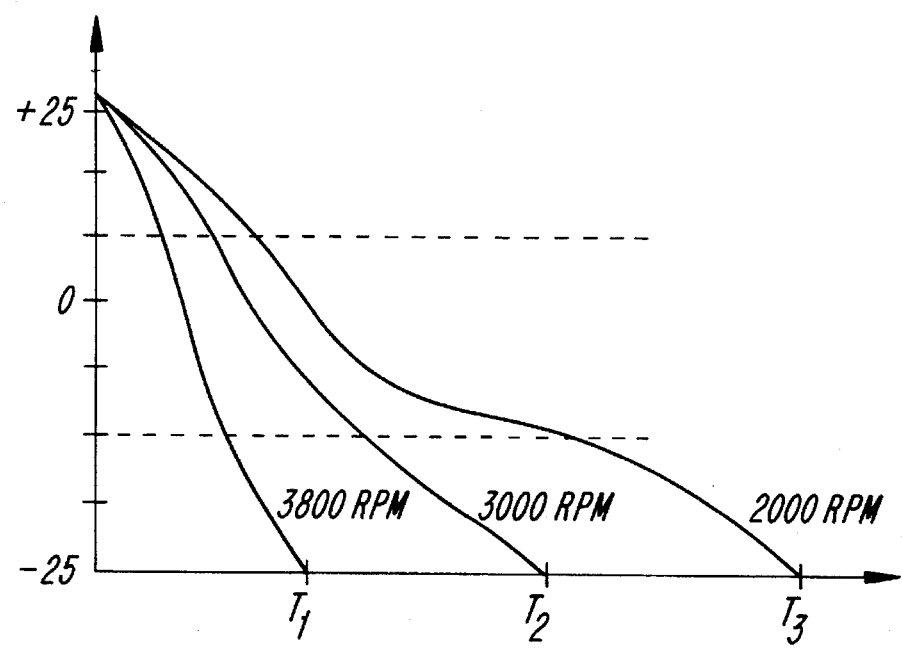
FIG. 4 is a graph illustrating the freezing speed of the evaporator according to the operation speed of the brushless D.C. motor.

FIG. 4 shows the change of the operation times from $t_1$ to $t_3$ until an evaporator becomes full down according to the operation speed setting of a compressor. A refrigerator adopting the present invention can control the cooling level by auxiliary fixing of the operation speed of a compressor, thereby adjusting the refrigerating time, so that the optimum operation thereof may be selected dependent upon the chamber temperature and the outside temperature. Then, a brushless D.C. motor is changed in operation efficiency characteristics according to load fluctuation, and the refrigeration cycle of the refrigerator has a great variation of the load fluctuation according to the outside temperature of the evaporator. It needs to keep the high operation efficiency characteristics by adjusting the input voltage of the brushless D.C. motor according to the load condition. Thus, the brushless D.C. motor can be operated at the appropriate dropped voltage during the weak load operation below the rate of output range thereof. For example, when the temperature of the evaporator reaches −18° C., the operation load drops by 40% over that at the room temperature. At this time, the brushless motor changes to low speed operation by dropping the input voltage thereof, so that its rate output is reduced by less than one-half. The operation efficiency of the brushless motor is lowered by 10 to 20% or more of the optimum efficiency of the rate of output operation. As shown in FIG. 1, if the temperature of the evaporator sensed by the thermistor 4 is below −18° C., a circuit 24 operates a voltage adjustment selecting switch 23 to apply the low voltage of 28 V to a brushless motor 15. During the normal operation of the refrigerator, the thermal switch 3 of the evaporator repeats the on-off operation based on the temperature setting.

Figure 6:
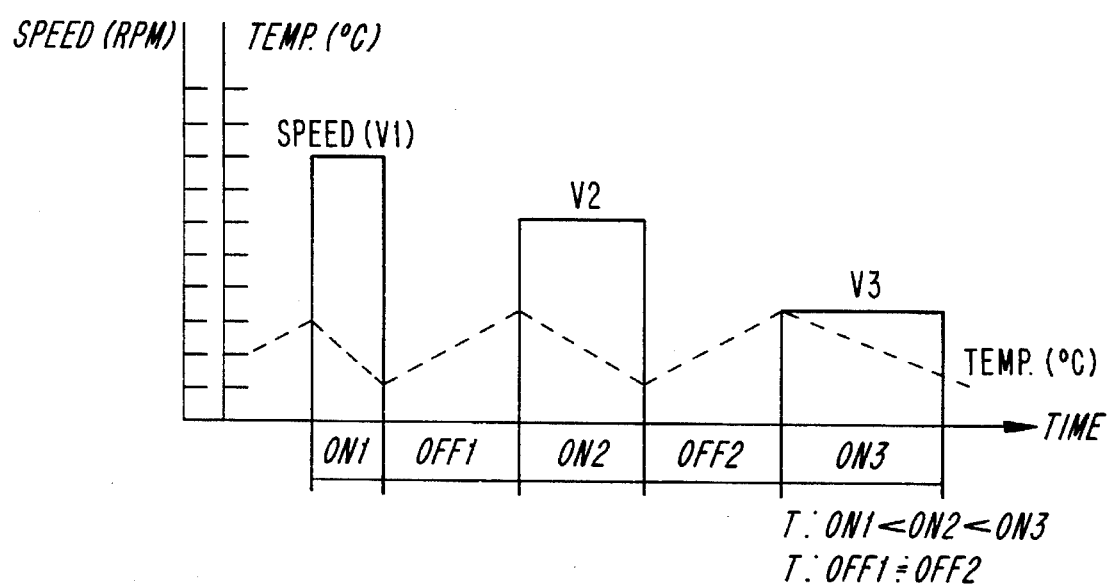
FIG. 6 is a graph illustrating the relationship between the temperature change period of the evaporator and the operation speed ratio of the brushless D.C. motor according to the intermittent operation control at an operation speed.

Furthermore, the on-off operation of the thermal switch 3 selecting the power voltage of 110 V and 220 V enables the operation control circuit 31 of a motor control circuit 14 to apply the low level "L" or high level "H" signal to an OR gate 32 to control a two phase control circuit 29, thereby synchronizing the operation of the compressor therewith. Therefore, as shown in FIG. 6, the refrigerating speed of the evaporator is variable according to the operation setting speeds $V_1$ to $V_3$ of the brushless D.C. motor, so that the on-off period of the thermal switch 3 is changed, and its operation ratio is controlled.

Figure 5:
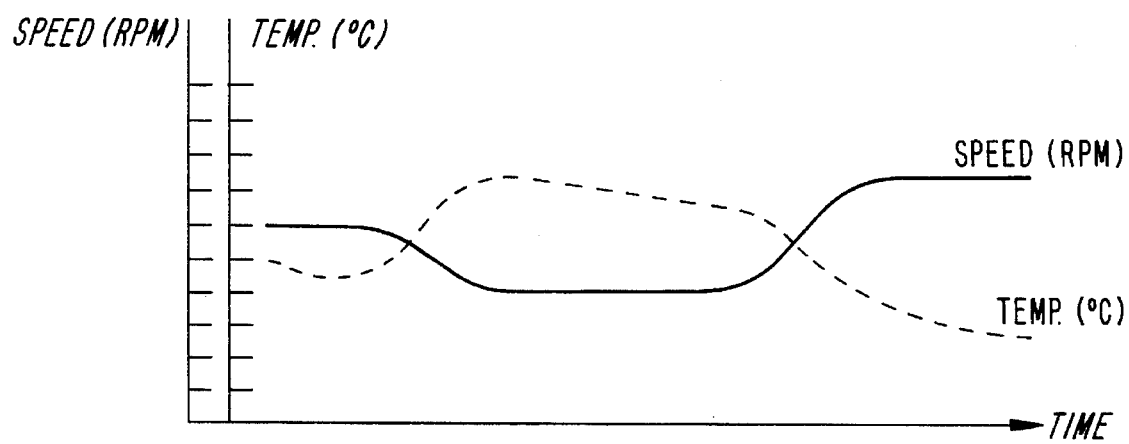
FIG. 5 is a graph illustrating the temperature change of the evaporator according to the continuous operation control of the brushless D.C. motor.

The present invention adjusts the temperature of an evaporator by the continuous variable speed operation of a brushless D.C. motor, so that continuous temperature control of the evaporator is performed as shown in FIG. 5, and the freezing and refrigerating chambers of a refrigerator are kept at a constant temperature without a temperature ripple.

I claim:

1. A compressor control circuit including a sensing portion for sensing a temperature in a freezing chamber of a refrigerator and a brushless DC motor for driving the refrigerator, said control circuit comprising:

a circuit for converting an inlet AC power source into at least two DC power sources to drive the brushless DC motor;

a voltage switching circuit for selecting one DC power source from the at least two DC power sources responsive to the sensing portion; and a motor control circuit for controlling a rotation speed of the brushless DC motor depending on the DC power source selected by said voltage switching circuit, wherein the motor control circuit comprises a two phase control circuit which includes at least one variable resistor for controlling the rotation speed of the brushless DC motor and at least one temperature sensor mounted in the freezing chamber, wherein said at least one temperature sensor is connected in parallel to said at least one variable resistor.

2. The compressor control circuit of claim 1, wherein the motor control circuit further comprises:

an operation control circuit for enabling an on-off operation of the brushless DC motor to be continued according to an on-off operation of a load sensor in the freezing chamber; and an overload protection circuit for stopping the brushless DC motor and cutting off the selected DC power source under an overload or binding condition of the compressor.

3. The compressor control circuit of claim 2, wherein the overload protection circuit includes a position sensor for detecting a speed of the motor, a timer, and a comparing circuit for receiving an input signal from the position sensor and comparing it with a reference frequency to output a logic signal to the two phase control circuit.

4. The compressor control circuit of claim 2, wherein the two phase control circuit is connected to an alternating switching amplification circuit including at most four bipolar switching elements for operating the brushless DC motor.

5. A compressor control circuit including a sensing portion for sensing a temperature in a freezing chamber of a refrigerator and a brushless DC motor for driving the refrigerator, said control circuit comprising:

a circuit for converting an inlet AC power source into at least two DC power sources to drive the brushless DC motor;

a voltage switching circuit for selecting one DC power source from the at least two DC power sources responsive to the sensing portion; and a motor control circuit for controlling a rotation speed of the brushless DC motor depending on the DC power source selected by said voltage switching circuit, wherein the motor control circuit comprises a two phase control circuit which includes a non-contact power switch for preventing an induction surge voltage generated at a door switch from applying to a system load.

6. A compressor control circuit for a refrigerator comprising:

a DC motor for driving the refrigerator;

a temperature sensor for sensing a temperature in a freezing chamber of the refrigerator;

means for converting an inlet AC power source into at least two DC power sources having different voltages to drive the DC motor;

a voltage switching circuit for selecting one of the at least two DC power sources responsive to the temperature sensor; and a motor control circuit for controlling a rotation speed of the DC motor depending on the DC power source selected by the voltage switching circuit, wherein the motor control circuit comprises:

a two phase control circuit including at least one second temperature sensor disposed in the freezing chamber and at least one variable resistor for controlling the rotation speed of the DC motor according to the temperature in the freezing chamber, the variable resistor and the at least one second temperature sensor being connected in parallel.

7. The compressor control circuit of claim 6, wherein the motor control circuit further comprises:

an operation control circuit for controlling an operation of the DC motor according to an on/off operation of a load sensor in the freezing chamber; and an overload protection circuit for cutting off the selected DC power source during an overload condition of the compressor.

8. The compressor control circuit of claim 6, wherein the two phase control circuit further includes a non-contact power switch for preventing an induction surge voltage generated at a door switch from applying to a system load.

9. A compressor control circuit for a refrigerator comprising:

a DC motor for driving the refrigerator;

a first temperature sensor for sensing a temperature in a freezing chamber of the refrigerator;

means for converting an inlet AC power source into at least two DC power sources having different voltages to drive the DC motor;

a voltage switching circuit for selecting one of the at least two DC power sources responsive to the first temperature sensor; and a motor control circuit for controlling a rotation speed of the DC motor depending on the DC power source selected by the voltage switching circuit, wherein the motor control circuit comprises a two phase control circuit which includes a second temperature sensor and at least one variable resistor for controlling the rotation speed of the DC motor.

10. The compressor control circuit of claim 9, wherein the two phase control circuit comprises two variable resistors and a third temperature sensor for controlling a range of rotation speed of the DC motor.

* * * * *